(12) United States Patent
Dmitriev et al.

(10) Patent No.: US 9,778,540 B2
(45) Date of Patent: Oct. 3, 2017

(54) COMPACT OPTICAL SWITCH HAVING ONLY TWO WAVEGUIDES AND A RESONANT CAVITY TO PROVIDE 60 DEGREE FOLDING

(71) Applicant: Universidade Federal Do Para—UFPA, Belem (BR)

(72) Inventors: Victor Dmitriev, Belem (BR); Gianni Masaki Tanaka Portela, Belem (BR); Raphael Rafsandjani Batista, Belem (BR)

(73) Assignee: UNIVERSIDADE FEDERAL DO PARA—UFPA (BR)

( * ) Notice: Subject to any disclaimer, the term of this patent is extended or adjusted under 35 U.S.C. 154(b) by 0 days.

(21) Appl. No.: 15/313,123

(22) PCT Filed: May 22, 2015

(86) PCT No.: PCT/BR2015/050062
§ 371 (c)(1),
(2) Date: Nov. 22, 2016

(87) PCT Pub. No.: WO2015/176151
PCT Pub. Date: Nov. 26, 2015

(65) Prior Publication Data
US 2017/0097557 A1    Apr. 6, 2017

(30) Foreign Application Priority Data

May 22, 2014   (BR) .............................. 102014016547

(51) Int. Cl.
*G02F 1/313*   (2006.01)

(52) U.S. Cl.
CPC ........ *G02F 1/3132* (2013.01); *G02F 2201/06* (2013.01); *G02F 2202/32* (2013.01); *G02F 2203/15* (2013.01)

(58) Field of Classification Search
CPC .... G02F 1/313; G02F 1/3132; G02F 2201/06; G02F 2202/32; G02F 2203/15
See application file for complete search history.

(56) References Cited

U.S. PATENT DOCUMENTS 6,822,784 B2 * 11/2004 Fukshima .............. B82Y 20/00
                                                     347/235
7,215,842 B2 *  5/2007 Sakai ..................... B82Y 20/00
                                                      385/15

(Continued)

FOREIGN PATENT DOCUMENTS

| CN | 101571657 | 11/2009 | ............ G02F 1/361 |
| JP | 2003215646 |  7/2003 | ............ G02B 6/12 |
| JP | 2006184618 |  7/2006 | ............ G02B 6/12 |

OTHER PUBLICATIONS

IEEE search results summaries.*

(Continued)

*Primary Examiner* — Andrew Jordan
(74) *Attorney, Agent, or Firm* — Hayes Soloway P.C.

(57) ABSTRACT

The present invention is based on a two-dimensional photonic crystal in which are inserted, in a controlled manner, defects that originate the waveguides and the resonant cavity that integrate the device. Its main function is to provide the control of the passage of an electromagnetic signal over a communications channel, blocking (state off) or allowing (state on) the passage of the signal. It also has the function of changing the propagation direction of an electromagnetic signal by an angle of 60 degrees, offering greater flexibility in the design of integrated optical systems. The operating principle of the device is associated with the excitation of dipole modes in the resonant cavity, which is based on a magneto-optical material. When the switch is under the influence of an external DC magnetic field $H_0$, a rotating dipole mode excited in the cavity allows the passage of the (Continued)

Figure 1A:
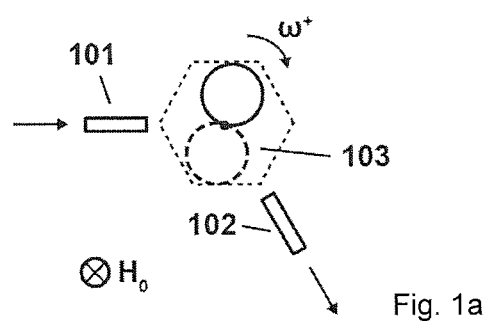

input signal to the output (state on), whereas without the application of $H_0$, a stationary dipole mode excited in the cavity, with the nodes aligned to the output waveguide, prevents the passage of the input signal to the output (state off).

4 Claims, 3 Drawing Sheets

(56) References Cited

U.S. PATENT DOCUMENTS

| | | | | |
|---|---|---|---|---|
| 7,310,468 B2* | 12/2007 | Kittaka | ............ | B82Y 20/00 385/131 |
| 7,428,352 B2 | 9/2008 | Noda et al. | ............ | 385/16 |
| 7,447,411 B2* | 11/2008 | Suzuki | ............ | B82Y 20/00 385/129 |
| 7,466,881 B1* | 12/2008 | Fattal | ............ | B82Y 20/00 359/346 |
| 7,738,749 B2* | 6/2010 | Noda | ............ | B82Y 20/00 385/125 |
| 8,693,823 B2* | 4/2014 | Ouyang | ............ | B82Y 20/00 385/147 |
| 2005/0002605 A1* | 1/2005 | Sakai | ............ | B82Y 20/00 385/27 |
| 2005/0249455 A1 | 11/2005 | Shirane et al. | ............ | 385/16 |
| 2008/0205842 A1* | 8/2008 | Suzuki | ............ | G02B 6/1225 385/131 |
| 2012/0243844 A1* | 9/2012 | Ouyang | ............ | B82Y 20/00 385/130 |
| 2016/0139437 A1* | 5/2016 | Dmitriev | ............ | G02B 6/4208 385/1 |
| 2017/0097557 A1* | 4/2017 | Dmitriev | ............ | G02F 1/3132 |
| 2017/0123288 A1* | 5/2017 | Dmitriev | ............ | G02F 1/3133 |

OTHER PUBLICATIONS

Dmitriev et al., "Possible mechanisms of switching in symmetrical two-ports based on 2D photonic crystals with magneto-optical resonators," Optics Letters, vol. 38, No. 20, Oct. 15, 2013 (4 pgs).
International Preliminary Report on Patentability issued in application PCT/BR2015/050062, dated Nov. 22, 2016 (13 pgs).
International Search Report issued in application No. PCT/BR2015/050062 dated Sep. 9, 2015 (10 pgs).

* cited by examiner

COMPACT OPTICAL SWITCH HAVING ONLY TWO WAVEGUIDES AND A RESONANT CAVITY TO PROVIDE 60 DEGREE FOLDING

The present invention relates to a compact optical switch based on a two-dimensional photonic crystal with 60 degree bending. It is intended, primarily, to control the propagation of electromagnetic signals in an optical communications channel, allowing or blocking the passage of the signal (switching function).

The need for devices with smaller dimensions, in order to attend the requirements of high integration density in new optical communications systems has motivated the development of new technologies, among which stands out the one based in structures known as "photonic crystals".

In these crystals, it occurs a periodic modulation of the electric permittivity or magnetic permeability of the different materials that constitute them. As a result, a range of forbidden frequencies, known as photonic band gap, is originated from the characteristic band diagram of these structures.

The propagation of electromagnetic waves with frequencies located on this range is forbidden because incident waves are fully reflected by the crystal. The working principle of most devices based on photonic crystals is somehow associated with the existence of this phenomenon.

Among the various devices that are used in optical systems, switches stand out. They have two operating states, namely: state on, in which the device transmits the incident electromagnetic signals, with low insertion losses between the input and output ports of the device; state off, in which there is no propagation of the signal, with high insulation between the input and output ports. The transition between these two states of operation is determined by the modification of a characteristic parameter of the photonic crystal on which the switch is based, as a result of the tuning of an external variable.

Due to the progress in research concerning on the development of new devices based on photonic crystals, several patents related to optical switches based on these structures have been deposited.

For example, on the device described by patent CN101571657, the variation of the intensity of an optical control signal is responsible for the change in refractive index of the material on which the switch is based. This phenomenon, known as Kerr effect, is associated with the transition between the states on and off in the device. The switch is based on a two-dimensional photonic crystal with triangular lattice of air holes made in a material with nonlinear properties. Some defects are inserted on the crystal, in a controlled manner, and they originate the waveguides and resonant cavity of the device.

On the other hand, the switch described in patent US2005249455 is based on an optical waveguide, whose core is formed by a two-dimensional photonic crystal in which two or more materials with different refractive indexes are distributed in a periodic way. The injection of a luminous sign or an electric current between electrodes present in the structure is responsible for the modification of the refractive index of the materials that constitute the crystal and, consequently, for the state in which the switch operates (on or off).

Also noteworthy is the switch described by patent JP2003215646. In this case, between two optical waveguides, is inserted an element responsible for switching (transition between on and off states). This element is based on a two-dimensional photonic crystal and a pair of electrodes. The transition between the operating states of the device is controlled by the value of a voltage applied between the two electrodes. Depending on the value of the applied voltage, the device can either allow (state on) or block (state off) the passage of an electromagnetic wave from the input to output waveguide.

Moreover, the switch described by patent JP2006184618 is based on a two-dimensional photonic crystal in which the refractive index of its constituent materials varies with the temperature. The control of the device temperature is responsible for setting the state in which the switch operates (on or off).

There are many ways to control the transition between the operation states on a switch based on photonic crystals technology. The present invention is based on a two-dimensional photonic crystal that consists of a triangular lattice of holes made in a magneto-optical material whose electric permittivity depends on the intensity of an applied external DC magnetic field. When the material is non magnetized (external magnetic field equal to 0), the switch operates in the off state. On the other hand, when it is magnetized (external magnetic field equal to $H_0$), the device operates in the state on.

One of the main problems inherent to the optical fiber technology concerns the bending angle of optical fibers. They work in accordance with the principle of total internal reflection and, due to this fact, they cannot be bent in a sharp way, which complicate their use, for example, in optical circuits that require many changes of direction in the propagation of optical signals.

By using photonic crystals based waveguides, this difficulty can be overcome because, with the correct choice of the topology of the curves that they incorporate, they can promote the change of propagation direction of an electromagnetic signal. This is because the principle of operation of these guides is not based on the total internal reflection principle, as in the case of optical fibers, but rather in the existence of photonic band gap.

In this case, the electromagnetic signal is confined inside the linear defect that originated the waveguide, being prevented from spreading out of that, because of the photonic band gap associated with the periodic structure that is around it.

The presented device incorporates, in its structure, a 60 degree bending, which provides flexibility in the design of integrated optical circuits. Moreover, it has reduced dimensions, which favors the increase in density of integration.

The presented switch operates with uniform magnetization, which simplifies the development of its magnetization circuit, since a simple electromagnet can be used to perform this function. The magnitude of the generated magnetic field is proportional to the electric current flowing in the electromagnet.

Between the performance characteristics of the device, the high bandwidth of operation, low insertion losses in the state on and high isolation between input and output waveguides in state off stand out.

In general, the device is based on a two-dimensional photonic crystal consisting of a triangular lattice of holes inserted in a magneto-optical material. In this crystal, two types of defects are inserted, namely:

a) Removal of rows of holes (linear defect) that originate the input and output waveguides;

b) Change of the radius and position of holes inserted into the magneto-optical material, which form the resonant cavity of the device.

Depending on magnetic field in the magneto-optical resonator, the switch can operate in two states, namely:

a) Nonmagnetized case of the magneto-optical material, in which the signal is not transmitted to the output waveguide;

b) Magnetized case of magneto-optical material, in which the signal is transmitted to the output waveguide.

Specifically, the device has the following characteristics:

a) The crystal lattice constant (a) is equal to 480 nanometers, for λ=1.55 micrometers, and the ratio a/λ is equal to 0.3097;

b) The radius of the air holes in the crystal lattice is equal to 0.3a;

c) The input and output waveguides are inserted by creating two linear defects;

d) An electromagnetic signal transferred to the output has its propagation direction changed by an angle of 60 degrees;

e) The resonant cavity is produced by changing the radius and position of some holes located in the center of the device, on the border between the two waveguides;

f) The intensity of an external DC magnetic field determines the state in which the device operates;

g) In state off, the external DC magnetic field is equal to 0 and a stationary dipole mode is excited on the resonant cavity, in a way that the nodes of the mode are aligned with the output waveguide and, consequently, there is no transference of the input signal to the output;

h) In state on, the external DC magnetic field is equal to $H_0$ and a rotating dipole mode is excited on the resonant cavity, resulting in the transfer of the input signal to the output;

i) The magneto-optical material in which is based the photonic crystal is anisotropic, being described by the following expressions for the electric permittivity and the magnetic permeability:

$$[\varepsilon] = \varepsilon_0 \begin{pmatrix} 6.25 & -ig & 0 \\ ig & 6.25 & 0 \\ 0 & 0 & 6.25 \end{pmatrix}; \mu = \mu_0$$

Where:

a) $\varepsilon$ is the electric permittivity of the material (in Farads per meter);

b) $\varepsilon_0$ is the electric permittivity of the free space (in Farads per meter);

c) $\mu$ is the magnetic permeability of the material (in Henrys per meter);

d) $\mu_0$ is the magnetic permeability of the free space (in Henrys per meter);

e) i is the imaginary unit;

f) g is a parameter dependent on the applied external DC magnetic field intensity.

In the following, the figures that illustrate the operation of the device are presented, as well as is described, in details, the developed invention.

Figure 1B:
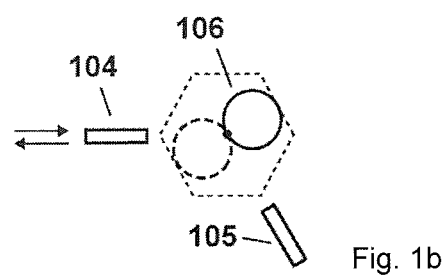

FIGS. 1a and 1b illustrate, schematically, the switch operating in states on and off, respectively.

Figure 2A:
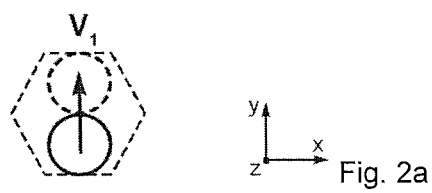
Figure 2B:
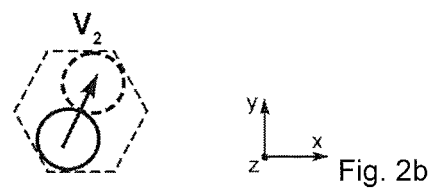
Figure 2C:
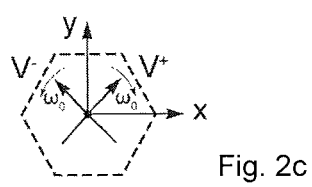
Figure 2D:
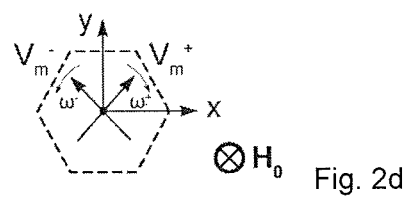

FIGS. 2a and 2b show the eigenvectors $V_1$ and $V_2$, which correspond to two of the six dipole modes that exist in the nonmagnetized resonator, with resonant frequency $\omega_0$. FIG. 2c shows two rotating modes $V^-$ and $V^+$ of the nonmagnetized resonator, rotating in opposite directions and having the same resonant frequency $\omega_0$. FIG. 2d shows two rotating modes $V_m^+$ and $V_m^-$ of the magnetized resonator, rotating in opposite directions and having resonance frequencies $\omega^+$ and $\omega^-$, respectively.

Figure 3:
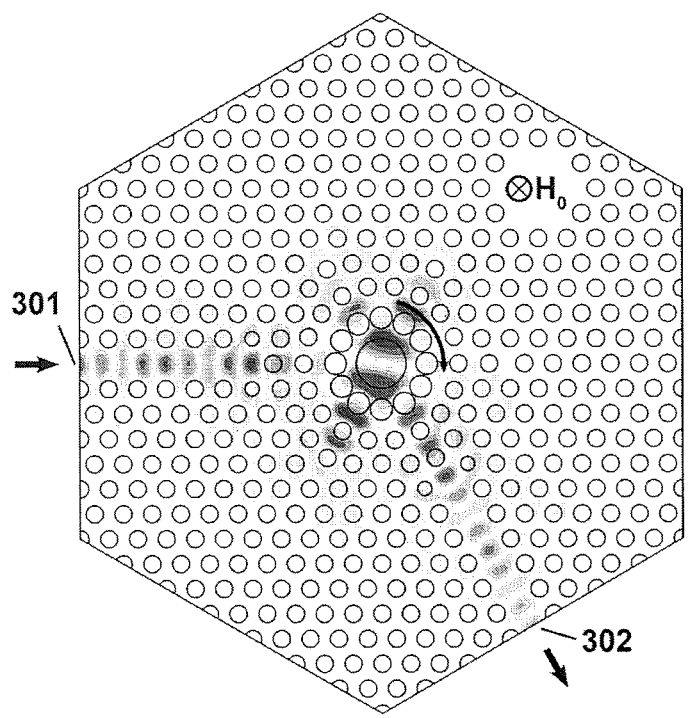

FIG. 3 shows a top view of the device operating in state on. The photonic crystal, the two rectilinear waveguides 301 (input) and 302 (output), the resonant cavity and the $H_Z$ component of electromagnetic signal, transferred from input to output, are shown, in the normalized frequency $\omega a/2\pi c=0.30308$, where $\omega$ is the angular frequency (in radians per second); a is the lattice constant of the crystal (in meters); c is the speed of light in free space (approximately equal to 300.000.000 meters per second).

Figure 4:
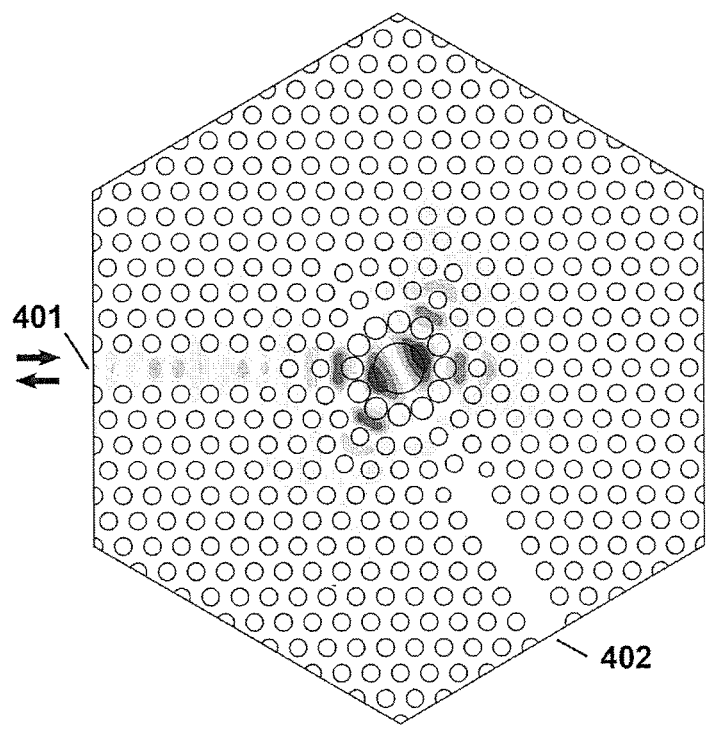

FIG. 4 presents a top view of the device operating in state off. The photonic crystal is shown, as well as the two rectilinear waveguides 401 (input) and 402 (output), the resonant cavity and the $H_Z$ component of the electromagnetic signal reflected back to the input, in the normalized frequency $\omega a/2\pi c=0.30308$.

Figure 5:
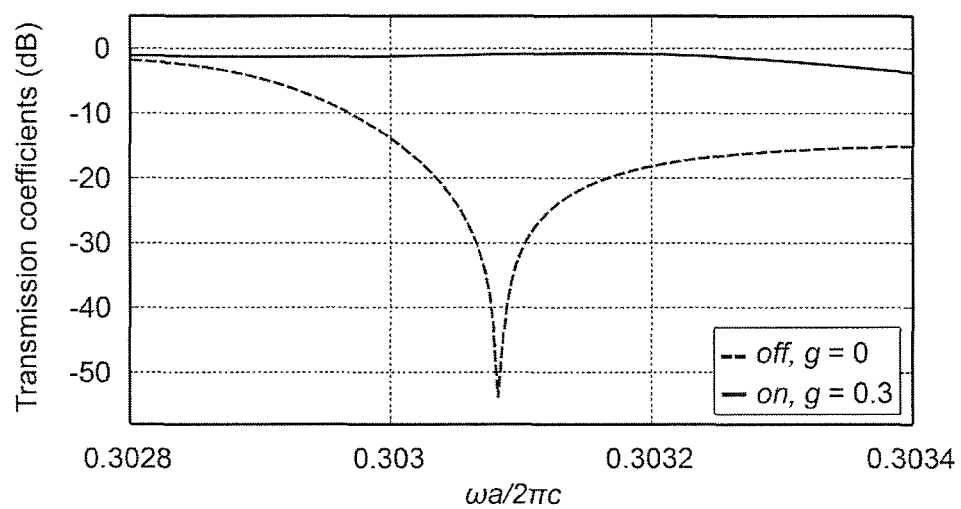

FIG. 5 shows the frequency response of the switch operating in states on and off.

When the device is under the influence of an external DC magnetic field $H_0$ (FIG. 1a), an electromagnetic signal applied to the input waveguide 101 excites, in the magneto-optical resonator, a rotating dipole mode 103. In turn, this fact promotes the transference of the signal present on the input to the output waveguide 102, with low insertion losses, corresponding to the state on of the device. The value of the parameter g, which is proportional to the magnitude of $H_0$, is equal to 0.3.

On the other hand, when the external DC magnetic field is equal to 0 (FIG. 1b), an electromagnetic signal applied to the input waveguide 104 excites, in the resonant cavity, a stationary dipole mode 106. The nodes of the mode are aligned with the output guide 105, in a way that electromagnetic waves are not excited on that. The incident signal is fully reflected, with high isolation between input and output. This situation corresponds to the state off and, in this case, the value of the parameter g is equal to 0.

This behavior can be explained by the analysis of modes excited in the magneto-optical resonator without loads connected to it, i.e., without the connection of the input and output waveguides. In the nonmagnetized case, there are six stationary dipole modes $V_i$ (i=1, 2, ..., 6) with resonant frequency $\omega_0$, and two of them are represented in FIGS. 2a ($V_1$ mode) and 2b ($V_2$ mode). Other modes can be obtained from rotations per 60 or 120 degrees of $V_1$ and $V_2$ modes around the z-axis.

These modes can be combined in order to produce degenerate rotating modes $V^-$ and $V^+$, with resonant frequency $\omega_0$ and rotating in opposite directions (FIG. 2c).

Application of an external DC magnetic field $H_0$, oriented along the z direction, removes the degeneracy of $V^-$ and $V^-$, so that now they possess different resonance frequencies $\omega^-$ and $\omega^+$ ($V_m^-$ and $V_m^+$ modes, respectively, represented in FIG. 2d).

The insertion of waveguides in the structure, both in the nonmagnetized and magnetized cases, also removes the degeneracy of the excited modes in the resonant cavity. The higher the coupling between the cavity and the waveguides the higher the difference between the frequencies of the previously degenerate modes.

The state on (FIG. 3) is obtained when the device is magnetized. In this case, a rotating mode ($V_m^-$ or $V_m^+$) is used, represented by the arched arrow located in the center of the figure.

On the other hand, the state off (FIG. 4) is obtained when the device is nonmagnetized. In this situation, it is used a mode that results from the combination between the stationary dipole modes $V_i$. The resulting mode has its nodes aligned with the output waveguide.

The frequency response of the device is presented in FIG. 5. Considering the excitation of port 1 (associated with the waveguides 301 and 401), the bandwidth of the device is equal to 186 GHz, considering the levels −2 dB and −15 dB of the curves associated with states on and off, respectively. In the normalized central frequency $\omega a/2\pi c=0.30308$, the insertion losses in state on are −0.9 dB and the isolation between the waveguides in the state off is −54 dB.

The invention claimed is:

1. Compact optical switch based on a two-dimensional photonic crystal with 60 degree bending, consisting of a two-dimensional photonic crystal in which two waveguides and one resonant cavity are inserted, characterized by blocking or allowing the passage of an electromagnetic signal from the input to the output accordingly to the intensity of applied external DC magnetic field.

2. Compact optical switch based on a two-dimensional photonic crystal with 60 degree bending in accordance with claim 1, characterized by the fact that it promotes the change of propagation direction of electromagnetic signals by an angle of 60 degrees, providing greater flexibility in the development of integrated optical systems.

3. Compact optical switch based on a two-dimensional photonic crystal with 60 degree bending in accordance with claim 1, characterized by operating, in state off (nonmagnetized case), with stationary dipole modes whose nodes are aligned with the output waveguide and, in state on (magnetized case), with rotating dipole modes.

4. Compact optical switch based on a two-dimensional photonic crystal with 60 degree bending in accordance with claim 1, characterized by the fact that, in the normalized central frequency $\omega a/2\pi c=0.30308$, the insertion losses in state on are −0.9 dB and the isolation between the ports in state off is −54 dB, while the bandwidth, considering the levels −2 dB of the insertion losses curve and −15 dB of the isolation curve, is 186 GHz.

* * * * *